United States Patent
Robinson (10) Patent No.: US 11,410,398 B2
(45) Date of Patent: Aug. 9, 2022

(54) AUGMENTING LIVE IMAGES OF A SCENE FOR OCCLUSION

(71) Applicant: Hewlett-Packard Development Company, L.P., Spring, TX (US)

(72) Inventor: Ian N. Robinson, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/274,532

(22) PCT Filed: Nov. 21, 2018

(86) PCT No.: PCT/US2018/062336
§ 371 (c)(1),
(2) Date: Mar. 9, 2021

(87) PCT Pub. No.: WO2020/106299
PCT Pub. Date: May 28, 2020

(65) Prior Publication Data
US 2021/0350625 A1 Nov. 11, 2021

(51) Int. Cl.
*G06T 19/00* (2011.01)
*G06T 7/10* (2017.01)
*G06T 7/70* (2017.01)
*G06K 9/62* (2022.01)

(52) U.S. Cl.
CPC .......... *G06T 19/006* (2013.01); *G06K 9/6267* (2013.01); *G06T 7/10* (2017.01); *G06T 7/70* (2017.01); *G06T 2207/10016* (2013.01)

(58) Field of Classification Search
CPC .......... G06T 19/006; G06T 7/10; G06T 7/70; G06T 2207/10016; G06K 9/6267
See application file for complete search history.

(56) References Cited

U.S. PATENT DOCUMENTS

| | | |
|---|---|---|
| 8,878,900 B2 | 11/2014 | Yang et al. |
| 2012/0249590 A1 | 10/2012 | Maciocci et al. |
| 2013/0063487 A1 | 3/2013 | Spiegel et al. |
| 2013/0215230 A1 | 8/2013 | Miesnieks et al. |
| 2014/0018464 A1 | 1/2014 | Senoo et al. |
| 2014/0104274 A1 | 4/2014 | Hilliges et al. |
| 2014/0184644 A1 | 7/2014 | Sharma et al. |

(Continued)

OTHER PUBLICATIONS

Manisah Mohd Shah, Haslina Arshad, and Riza Sulaiman, Occlusion in Augmented Reality, Jun. 2012, In 2012 8th International Conference on Information Science and Digital Content Technology (ICIDT2012), vol. 2, pp. 372-378. (Year: 2012).*

(Continued)

*Primary Examiner* — Jeffery A Brier
(74) *Attorney, Agent, or Firm* — HP. Inc. Patent Dept.

(57) ABSTRACT

An example image processing system augments live images of a scene to reduce or eliminate occlusion of an object of interest. The image processing system can detect an occlusion of an object in a live image of the scene. The image processing system can further access a data store that stores a three-dimensional representation of the scene with the object being present. The image processing system augments the live image to depict the object without at least a portion of the occlusion, using data provided with the three-dimensional representation of the scene.

15 Claims, 4 Drawing Sheets

(56) References Cited

U.S. PATENT DOCUMENTS

| | | | |
|---|---|---|---|
| 2014/0321702 A1* | 10/2014 | Schmalstieg | G06K 9/00624 |
| | | | 382/103 |
| 2016/0180595 A1 | 6/2016 | Grossinger et al. | |
| 2016/0217621 A1* | 7/2016 | Raghoebardajal | G06T 19/006 |
| 2016/0314622 A1 | 10/2016 | Davis et al. | |
| 2016/0364912 A1 | 12/2016 | Cho et al. | |
| 2017/0140552 A1 | 5/2017 | Woo et al. | |
| 2017/0161950 A1 | 6/2017 | Seder et al. | |
| 2019/0015163 A1* | 1/2019 | Abhari | H04N 7/181 |

OTHER PUBLICATIONS

Abate, et al., "An Image Based Approach to Hand Occlusions in Mixed Reality Environments", VRLab, University of Salerno, R. Shumaker and S. Lackey (Eds.): VAMR 2014, Part I, LNCS 8525, pp. 319-328, 2014.

* cited by examiner

AUGMENTING LIVE IMAGES OF A SCENE FOR OCCLUSION

BACKGROUND

Digital imaging devices have a variety of uses, above and beyond image capture. For example, camera-equipped mobile devices can run applications that use the device's camera to scan documents, take measurements, and perform authentication. In retail centers, users can use their mobile devices to scan product codes (e.g., barcodes) to view information about a product at an online site.

Augmented reality systems are also an increasingly utilized application for digital imaging devices. Mobile devices, for example, can run applications to alter imagery with overlay content, manipulating image data within the image itself (e.g., making funny faces from images) or augmenting the content of captured images (e.g., replacing faces of people on captured images).

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Examples provide for an imaging system and method for augmenting a live image to eliminate or reduce occlusion of an object of interest. In particular, a system can utilize a camera to continuously capture and render live images of a scene that includes the object of interest. Through image analysis, the system can create and store a three-dimensional representation of the scene, including a three-dimensional representation of the object of interest. When a change is detected in the scene, the system can determine if the change is the result of a new object that occludes the object of interest. If occlusion of the object of interest is detect, the system can further augment the live image by replacing, or at least mitigating, the occluded portion of the live image with image data from the three-dimensional representation of the scene and the object of interest.

In some examples, an image processing system augments live images of a scene to reduce or eliminate occlusion of an object of interest. The image processing system can detect an occlusion of an object in a live image of the scene. The image processing system can further access a data store that stores a three-dimensional representation of the scene with the object being present. The image processing system augments the live image to depict the object without at least a portion of the occlusion, using data provided with the three-dimensional representation of the scene.

Accordingly, example imaging systems, as described, offer advantages with respect to applications where, for example, an operator uses his hand to move an object of interest (e.g., component for assembly, documentation for assembling a component, item being repaired, etc.). Examples recognize that with small-scale manual tasks, the user's hands (or tool) can obscure important features of the objects that are the subjects of the task. Thus, in an aspect, example imaging systems allow the operator to view the object that is in his hand, or beneath his hand, without occlusion resulting from the presence of his hand. As the object is moved or manipulated, some examples further enable the imaging system to render the object in manipulated form, using the stored three-dimensional representation.

Examples described herein provide that methods, techniques, and actions performed by a computing device are performed programmatically, or as a computer-implemented method. Programmatically, as used, means through the use of code or computer-executable instructions. These instructions can be stored in a memory resource of the computing device. A programmatically performed step may or may not be automatic.

Additionally, examples described herein can be implemented using programmatic modules, engines, or components. A programmatic module, engine, or component can include a program, a sub-routine, a portion of a program, or a software component or a hardware component capable of performing stated tasks or functions. As used herein, a module or component can exist on a hardware component independently of other modules or components. Alternatively, a module or component can be a shared element or process of other modules, programs, or machines.

Moreover, examples described herein can utilize specialized computing devices, including processing and memory resources. For example, examples described may be implemented, in whole or in part, on computing devices such as servers, desktop computers, cellular or smartphones, personal digital assistants (e.g., PDAs), laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and to execute the program corresponds to a special-purpose computing device. Furthermore, any computing systems referred to in the specification may include a single processor or may be architectures employing multiple processor designs for increased computing capability.

Furthermore, examples described herein may be implemented through the use of instructions that are executable by a processor. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

Figure 1:
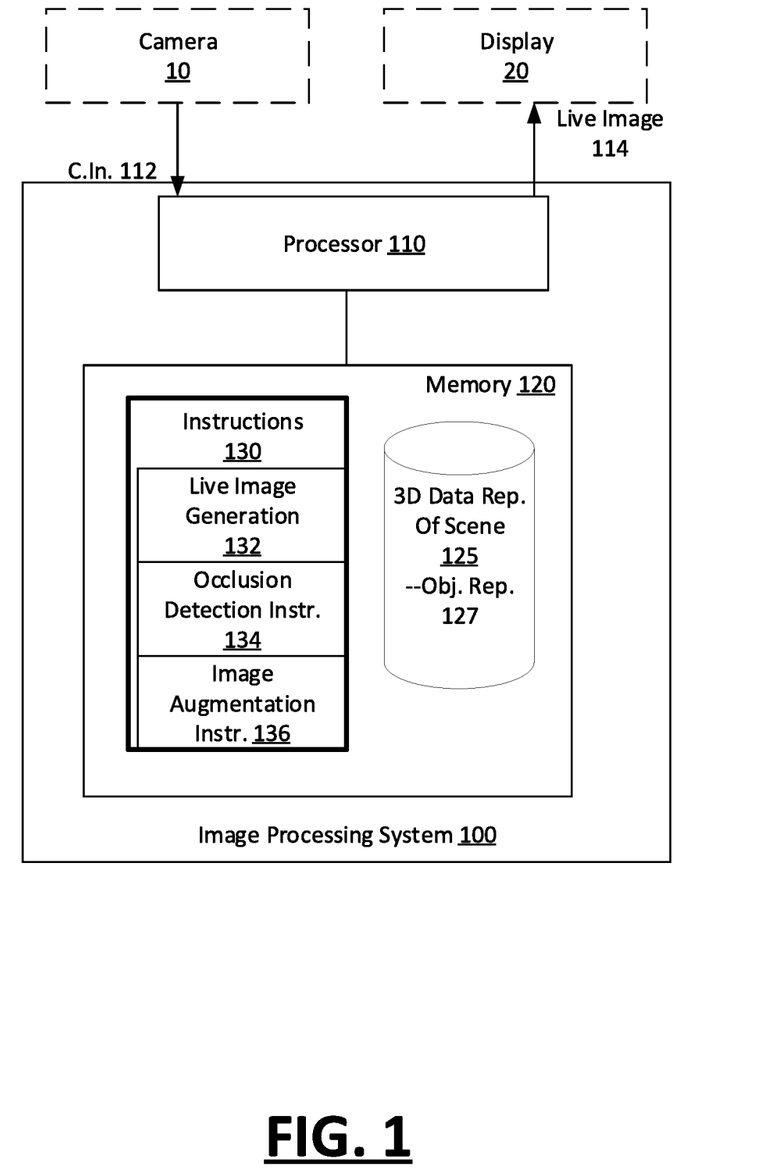
FIG. 1 illustrates an example image processing system to augment live images of a scene.

In an example, an image processing system 100 includes a processor 110 and memory 120. The memory 120 stores a three-dimensional representation 125 of a given scene. The memory 120 may also store an instruction set 130, where the instruction set is executable by the processor 110 to implement image processing operations as described. The processor 110 can access the instruction set 130 and the three-dimensional representation 125, to generate an augmented live image of the scene.

In examples, the processor 110 receives camera input 112 and generates a live image 114 for a display device 20. In some examples, the camera 10 and the display device 20 are integrated components of the system 100. For example, the system 100 may be implemented as a computing system that includes the camera 10 and display device 20 as respective input and output devices for the system. Accordingly, the system 100 may be implemented using a laptop computer, tablet or mobile device (e.g., feature phone), or headset computing device. In variations, the system 100 can be operatively connected to at least one of the camera 10 or the display device 20, using, for example, a wireless connection (e.g., such as provided by Wi-Fi Direct, Bluetooth, etc.) or wireline data connection (e.g., such as provided through USB-type port). In the latter case, the system 100 can be implemented as part of, for example, a tool, assembly platform or other manual operation stage.

In an example, the three-dimensional representation 125 can include image data and contextual information that is descriptive of the scene that is being imaged by the camera 10. The three-dimensional representation 125 may also include separate representations of individual objects and features of the scene. As described by examples, the three-dimensional representation 125 can include a three-dimensional object representation 127 of a static and moveable object of interest that is present in the scene. The object of interest may correspond to, for example, a part, component, or printed media (e.g., document). Additionally, the three-dimensional representation 125 can include three-dimensional representations of persistent objects and features which are not moveable, or alternatively, not expected to be moved. The three-dimensional representation 125 may also be constructed by the system 100 based on the camera input 112, and the representation can include other features of the scene, such as of a surface or surface feature that is present in the scene when the scene is being imaged by the camera 10.

In some examples, the processor 110 use image data of camera 10 to generate the three-dimensional representation 125 of the scene. The three-dimensional representation 125 is generated at each current time interval, for use with a subsequent time interval, in the event the object of interest is occluded. The three-dimensional representation 125 is thus created, using image data from camera 10, which is also used to provide image data for rendering the live image. In some examples, when the dynamic object is detected, the processor 110 creates the three-dimensional representation 125 without use of image data that depicts the dynamic object. The capture of image data from the scene can be repeated at each current interval, so that the object of interest can be depicted from the image of the scene from an immediately prior time interval.

According to examples, the instruction set 130 includes image generation instructions 132, occlusion detection instructions 134, and image augmentation instructions 136. The processor 110 can execute the image generation instructions 132 to generate a live image 114 of the scene using the camera input 112. The live image 114 may be generated for and rendered on the display device 20. The live image 114 can correspond to, a frame of a video output that depicts the scene on the display device 20 in real-time. The camera input 112 can correspond to, for example, a series of image frames, which processor 110 can render as live video on the display device 20. Thus, the live image 114 can correspond to a live video output that depicts a current state of the scene in real time.

While generating the live image 114, the processor 110 can execute the occlusion detection instructions 134 to detect an occlusion of the object of interest in the scene. In an example, the processor 110 can execute the occlusion detection instructions 134 to detect when a portion of the object of interest, as depicted in the live image 114, changes. As an addition or variation, the processor 110 can execute the occlusion detection instructions 134 to implement a classifier to detect objects of a particular class that enter the scene. For example, the processor 110 can implement a classifier to detect a predetermined class of objects that are expected to enter the scene intermittingly, or on occasion, to pick up, interact or otherwise manipulate the object of interest. The processor 110 can execute the occlusion detection instructions 134 to detect when such an dynamic object enters the scene, and when a position of the detected dynamic object overlays the object of interest from the point of view of the camera 10 and display 20.

In some examples, the processor 110 can execute the occlusion detection instructions 134 to recognize the object of interest when the object of interest is moved by a dynamic object. In this way, the processor 110 can track the occlusion caused by the dynamic object over time, even as the dynamic object moves the object of interest.

In response to detecting occlusion of the object of interest, the processor 110 can access the three-dimensional representation 125 to obtain the three-dimensional object representation 127. The processor 110 can further execute the image augmentation instructions 136 to augment the depiction of the object of interest in the live image, to eliminate or reduce the occlusion caused by the dynamic object. In examples, the processor 110 executes the image augmentation instructions 136 to map an occluded portion of the object of interest, as depicted in the live image 114, with a portion of the three-dimensional object representation 127. In this way, at least a portion of the occlusion can be replaced by a corresponding portion of the three-dimensional object representation 127. As an addition or variation, a corresponding portion of the dynamic object (e.g., fingers of the user hand) can be visually altered, such as made transparent (e.g., in outline form, with interior made transparent). For example, pixels of the live image 114 which have values that coincide with the occluded portion of the object of interest can have their respective values replaced by values determined from a corresponding portion of the three-dimensional object representation 127.

In other variations, the processor 110 can execute the occlusion detection instructions 134 and the image augmentation instructions 136 to detect the location of the object of interest in a given frame. Within each frame, the processor 110 can replace a portion of the live image 114 that depicts the occluded portion of the object of interest with a depiction of the object that is generated from the three-dimensional object representation 127. As an addition or variation, the processor 110 can alter the respective portion of the dynamic object by, for example, making the respective portion of the dynamic object transparent or in outline form.

In other examples, the processor 110 can execute the occlusion detection instructions 134 and the image augmentation instructions 136 to track the object being moved, or otherwise manipulated within the scene, by the dynamic object. Once the processor 110 detects the object of interest as being occluded, the processor 110 can process, for example, the camera input 112 to detect, on a frame-by-frame basis, the respective locations of the object of interest and of the dynamic object. The processor 110 can then implement imaging processes to, for example, replace individual pixels of the dynamic object with respective portions of the three-dimensional object representation 127.

In variations, the processor 110 can execute the image augmentation instructions 136 to layer the respective portions of an image frame to separately identify at least one of the dynamic object or the object of interest. The processor 110 can visually alter the layered image(s) to reduce or eliminate the appearance of occlusion. For example, the processor 110 can execute the image augmentation instructions 136 by layering or superimposing the dynamic object over the object of interest, and by making respective pixels of the dynamic object transparent and/or hidden (e.g., to provide an outline of the dynamic object) while pixels representing the object of interest are made visible.

Figure 2:
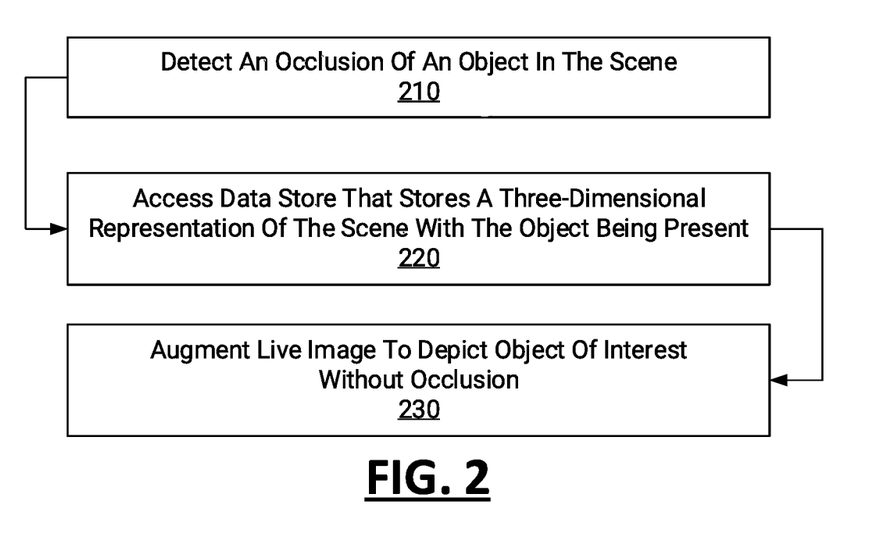
FIG. 2 illustrates an example method for augmenting live images of a scene.

FIG. 2 illustrates an example method for augmenting a live image of a scene. An example method such as described may be implemented using, for example, an image processing system such as described with an example of FIG. 1. Accordingly, reference may be made to elements of FIG. 1 for purpose of illustrating a suitable component for performing a step or sub-step being described with an example of FIG. 2.

In an example, system 100 can image a scene to detect an occlusion of an object of interest that is present in the scene (210). The imaging of the scene can be in form of generating, or receiving and processing, a series of image frames from a camera, or set of cameras that are configured to capture the scene. The image frames can enable the live image 114 to be rendered in video format on a display device 20. As described by various examples, the occlusion of the object of interest may be caused by another dynamic object that interacts and/or manipulates the object of interest. The dynamic object can be considered dynamic, in that the dynamic object moves to interact and manipulate the object of interest, as compared to the object of interest, which may be static and moveable.

A three-dimensional representation 125 of the scene can identify the object of interest, which may be static but moveable. Still further, the three-dimensional representation 125 can define other objects or features of the scene to be static and persistent. Static and persistent objects and features can be used to, for example, determine contextual information about the object of interest, where the contextual information can identify a relative location and/or orientation of the object of interest in the scene.

As described by various examples, the occlusion of the object of interest can include detecting a dynamic object, such as an object that is present and changing locations over the series of image frames, reflecting movement of the object during a time interval of the image frames. Still further, the detected object can be of a predetermined class, or predetermined classes, and detected through corresponding classifiers. For example, a classifier may detect a presence of a hand or a tool in a given image frame, and the system 100 may analyze subsequent image frames to detect the hand or tool at different locations relative to the object of interest.

Still further, the system 100 may deploy classifiers to segment a portion of an image frame where the dynamic object is depicted. The segmenting can provide an image of the dynamic object that can be layered with respect to an image of the rest of the scene, or define a region of the image frame over which an augmenting image may be overlaid.

According to examples, the system 100 may access the three-dimensional representation 125 of the scene, where the three-dimensional representation includes a three-dimensional object representation 127 (220) for the object of interest. As described by other examples, the three-dimensional object representation 127 may include information about a current state of the object of interest, including information that identifies a location and/or orientation of the object in the scene, as well as information that identifies the location of the object of interest with respect to a current image segment provided by the camera 10. For example, the system 100 can identify occlusion of the object of interest by determining an overlap between the position of the segment in the image frame (representing the dynamic or dynamic object) and the known or expected position of the object of interest.

In examples, the system 100 augments the live image to depict the object of interest without at least a portion of the occlusion that occurs at a given moment as a result of the dynamic object (230). The system 100 may augment the live image to at least partially render the occluded portion of the object of interest, using image data obtained from the three-dimensional representation 125 of the scene.

Figure 3:
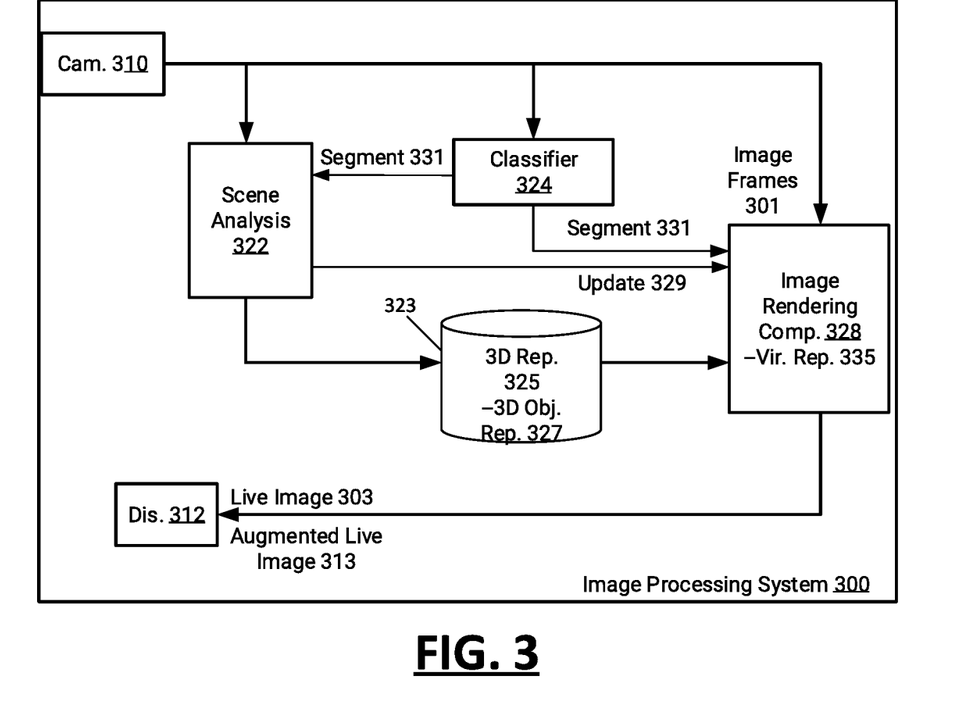
FIG. 3 illustrates another example image processing system to augment live images of a scene.

FIG. 3 illustrates another example image processing system. In an example of FIG. 3, an image processing system 300 includes a camera component 310, display device 312, and processes for analyzing and/or rendering live images. In examples, the system 300 can be implemented as an integrated computer system, such as provided by a portable computing system (e.g., laptop, tablet, mobile communication device, or headset computer system). In variations, the system 300 can be implemented as a distributed computer system, with a computing component of the system 300 communicating with the camera component 310 and/or display device 312 using wireless (e.g., Wi-Fi, Bluetooth) or wireline (e.g., USB interfaces) communication interfaces and channels. By example, the system 300 can be implemented in context of an assembly or inspection platform, where an operator or tool is expected to manipulate an object of interest (e.g., human operator picks up an object of interest using a hand or tool). As further illustration, in such examples, the object of interest may be small relative to the human hand, such that the user's fingers may occlude surface features or portions of the object of interest. Still further, in other examples, the system 300 can be employed in context of surgical procedures, where a surgeon or robot are to perform a delicate procedure on a patient. In such examples, the object of interest can correspond to a human organ, or set of organs, with other aspects of the human anatomy (e.g., bones, unaffected portion of the human body) representing aspects of the scene that are static and not moveable, or expected to not be moved.

The camera component 310 can be implemented using, for example, a camera that utilizes landmark or fiducials of the scene to develop a three-dimensional representation of the object of interest and other aspects of the scene as the camera is moved. In variations, the camera component 310 can be implemented using a combination of a camera and depth sensor, or a pair of cameras that are operating in a stereoscopic configuration.

In examples, the camera component 310 can image a target site, corresponding to a scene, where an object of interest is provided. An output of the camera component 310 can correspond to a series of image frames that the image processing system 300 renders as live video on display device 312. In some variations, the output of the camera component 310 can also include depth information for the scene, from a perspective or reference of the camera 310.

The image processing system 300 can be implemented by a memory that stores instructions, and by a processor that accesses the memory to implement multiple image processing operations. In an example, the system 300 can be implemented as described with an example of FIG. 1 (e.g., image processing system 100). In an aspect in which the system 300 is implemented as an integrated computing system (e.g., in a portable computer, such as a tablet, headset or laptop), the image frames 301 can be received and processed by a computing device or resource of the image processing system 300, over a serial connection or other internal data buss. In an aspect in which the system 300 is implemented as a distributed computing system, the image frames 301 can be received by a computing device or resource of the image processing system 300 over a wireless or wireless connection.

The image processing system 300 can include processes or functionality that include scene building 322, object detection and recognition 324, and image rendering 328. The scene building 322 can include processes that analyze the image frames 301, as well as depth information when available, to detect objects and features of the scene, and further to determine information that represents the detected objects and features in three-dimensions. The object detection/recognition 324 can include one or multiple classifiers that detect and recognize the presence of a dynamic object. The object detection/recognition 324 can further detect other objects or features, such as persistently static or fixed objects or features. The object detection/recognition 324 can further determine information that represents the persistently static objects or features in three-dimensions. In some examples, the scene building 322 can use depth information and/or multiple perspectives to build a three-dimensional object representation 327 of an expected object of interest in context of the scene. The three-dimensional object representation 327 of the object of interest can, for example, identify a distance of the object of interest relative to the viewpoint(s) of the camera(s), as well as with respect to persistently fixed objects or features of the scene. The three-dimensional object representation 327 may also be determined relative to a reference frame that is defined for the scene or object of interest.

Over a given duration, the scene building 322 can process the image frames 301 to determine the three-dimensional object representation 327 for the object of interest, and further to associate a state with the respective three-dimensional object representation 327. The state of the three-dimensional object representation 327 can identify an orientation and/or position of the object of interest, relative to, for example, another persistent object or feature of the space and/or a reference frame of the scene or object. Through further monitoring, the scene building 322 can record new states of the object of interest, as, for example, the object of interest being moved and manipulated. Each state can, for example, associate the object of interest with at least one of (i) a position of the object of interest, relative to another object or feature or reference frame, (ii) a particular orientation of the object of interest, and/or (iii) image data that reflects an appearance of the object of interest in the state, from at least one viewpoint of the camera component 310.

In examples, the scene building 322 may use image data from the camera component 310 to create the three-dimensional representation 325 of the scene. Thus, the same camera component 310 (e.g., lens with view) can be used to capture image data for rendering the live image, as well as for creating or recording the three-dimensional representation 325 of the scene. Thus, in such examples, the three-dimensional representation 325 is not generated from a camera component that is different from the one used to create the live image.

In examples, the three-dimensional representation 325 can be generated from a current image frame, using, for example, associated depth data (e.g., from a depth sensor), as well as other contextual information (e.g., relative location of objects of interest to other objects). Still further, in other examples the scene building 322 can use multiple image frames over a given time interval (e.g., a few seconds) to build the three-dimensional representation 325.

In examples, the three-dimensional representation 325 can be continuously generated and/or updated to represent the scene in a most recent time interval. In this way, the three-dimensional representation 325 can provide image data from which the live image can be augmented. Thus, for example, the scene building 322 can generate the three-dimensional representation 325 to represent an immediate prior time interval to a time interval that is current. To enable immediate retrieval of data, the data store 323 can be implemented using, for example, cache or other memory resource that can enable fast retrieval of data. This may allow other processes, such as described with image rendering 328, to retrieve image data from an immediate prior interval that may have occurred, for example, a few seconds in the past.

The object detection/recognition 324 can implement processes to detect and segment dynamic objects when such objects enter the scene. The object detection/recognition 324 can segment, or otherwise filter portions of a given image frame 301 which are likely to correspond to the dynamic object. Once the dynamic object is detected, the object detection/recognition 324 can generate a corresponding image segment 331, which can be communicated to scene building 322 and/or image rendering component 328. The scene building 322 can use the image segment 331 to filter image data that is otherwise used to generate the three-dimensional representation 325 of the scene. Additionally, as further described, once occlusion of the object of interest is detected, the image rendering component 328 can use the image segment 331 to create a visual effect in which at least a portion of the dynamic object is reduced or eliminated from the augmented live image 313, at least with respect to where the dynamic object occludes the object of interest.

In some examples, the object detection/recognition 324 implements a classifier 326 for a particular type of object or objects, such as for a hand or tool (e.g., caliper, robotic grasp). The object detection/recognition 324 can use the classifier 326 to detect dynamic objects of the particular type(s). The object detection/recognition 324 can further segment the dynamic object (or generate image segment 331) as it moves across the scene. For example, the object detection/recognition 324 can be implemented to detect a dynamic object that is a hand. When a hand enters the scene, the object detection/recognition 324 can segment image data depicting the dynamic object from a remainder of the image data. The remainder of the image data can be used for scene building 322, while the image segment 331 representing the dynamic object can be used by image rendering 328.

For a given image frame, some examples further provide that the object detection/recognition 324 can layer a segment of the image frame that depicts the dynamic object. As the dynamic object moves, for example, towards the object of interest, the object detection/recognition 324 can update each of (i) the segmented portion of the live image which depicts the dynamic object for use by image rendering 328, and (ii) a remainder of the image, for use by scene building 322. In this way, the object detection/recognition 324 can track a dynamic object as it moves into the scene and interacts with the object of interest. At the same time, non-occluded portions of the scene can be used by the scene building 322 to generate the three-dimensional representation 325 of the scene.

In examples, the object detection/recognition 324 can further detect the shape of the dynamic object when the shape of the dynamic object changes in the image frame. For example, in the case where the dynamic object is a hand, the respective classifier 326 may be trained to detect different orientations and configurations of the hand from the viewpoint of the camera component 310. For example, the classifier 326 may detect instances when the hand's fingers are curled, or when the hand is posed palm-out or palm-in.

The image rendering 328 can retrieve the updated three-dimensional representation 325 from the store 323. The image rendering 328 can also receive the segment 331 from the object detection/recognition 324, as well as contextual information or other data that identifies where the dynamic object (as represented by the segment 331) occludes the object of interest (as represented by the object representation 327 of the three-dimensional representation 325. The image rendering 328 can use the three-dimensional representation 327 to generate a virtualized representation 335 of the object of interest when the object of interest becomes occluded by the dynamic object. Alternatively, the image rendering 328 can generate the virtualized representation 335 of a portion of the object of interest that is occluded by the dynamic object. Additionally, the image rendering 328 can implement visual effects to reduce or eliminate the rendering of the dynamic object, as to at least the portion of the segment 331 that occludes the object of interest.

In some variations, the scene analysis 322 can also provide an update 329 specifying the current position and orientation of the camera 310. This information is used by the image rendering component 328 to render any required portions of the three-dimensional representation 325 from the same viewpoint as the image frames of the live image 313.

In some variations, the scene building 322 can also provide an update to the three-dimensional representation, where the update identifies, for example, an updated three-dimensional representation 327 of the object (e.g., such as when the object is moved) In some variations, the scene building 322 can track the object of interest by detecting, for example, a set of edge or boundary features, or other distinguishing features of the object of interest. Thus, the scene building 322 may detect that the object of interest has not changed state, even when a portion of the object of interest is not depicted in the image frame. The scene building 322 can communicate the update to include contextual information, such as position and/or dimensional information of the object of interest in the particular image frame. Through use of contextual information, the determination of the portion the image frame where the object of interest is likely located is not impacted by subsequent occlusion, which may result from the dynamic object. The image rendering 328 can, for example, map the state information of the object of interest (e.g., location, orientation, etc.) to discrete portions of the image frame (e.g., pixel locations), where such discrete image portions would likely have values that correspond to the object of interest, even after occlusion occurs. Sill further, the image rendering 328 can generate the virtualized representation 335 of the object of interest based on the contextual information communicated via the three-dimensional object representation 327. In some examples, the virtualized representation 335 can be generated from data that is retrieved from a file (e.g., as stored with the data store 323) in order to depict visual aspects of the object of interest that may otherwise be occluded by the dynamic object in the image frames 301 of the camera component 310. For example, the virtualized representation 335 can reflect a shape, surface feature, texture, pattern or other visible feature of the object of interest. The virtualized representation 335 can also be determined from, for example, image data associated with the current state of the object of interest, as determined from the three-dimensional representation 325. According to examples, the virtualized representation 335 can be generated from image data that is stored for the object of interest (e.g., as part of the three-dimensional object representation 327), just prior to the dynamic object entering the scene, and/or just prior to the dynamic object occluding the object of interest. In examples, the image rendering 328 can superimpose, or otherwise integrate the virtualized representation 335 in the image frame, to create an augmented live image 313 of the scene.

Further, the object detection/recognition 324 can continuously update scene building 322 and image rendering 328 as to a segment 331 of the frame image that corresponds to the depiction of the dynamic object in the current image frame 301. For example, the object detection/recognition 324 can identify pixels that comprise the segment 331 to the scene building 322 and image rendering 328, as detected from image data for a given frame, where the segment 331 represents the dynamic object as depicted in a current frame. In such examples, the segment 331 can identify specific pixels of the image frame which represent the dynamic object. As an addition or variation, the object detection/recognition 324 can further provide the scene building 322 and image rendering 328 with contextual information, along with the image segment 331, to enable (i) scene building 322 to generate the three-dimensional representation without use of image segment 331 that corresponds to the dynamic object, and (ii) image rendering 328 to render the live image 303 in augmented form, with portions of the live image that reflect the image segment 331 being modified.

According to examples, the image rendering 328 renders an augmented live image 313 of the scene, using the image frames 301, with additional augmentation to account for occlusion of the object of interest. The image rendering 328 can detect the onset of the object of interest being occluded when an image frame is analyzed in which the location of the segment 331, representing image data of the dynamic object, first overlaps with the portion of the image data where the object of interest is located. In subsequent image frames, the image rendering 328 may determine that the occlusion increases, based on the update 329, representing the current state of the object of interest, as well as the updated segment 331, representing the depiction of the dynamic object in the current image frame.

In an example, the image rendering 328 can render the virtualized representation 335 as a layer that can be superimposed with the segment 331, so that portions of the segment 331 which overlap with the virtualized representation 335 are hidden. As an addition or variation, the image rendering 328 can identify the portion of the segment 331 which overlaps with the virtualized representation 335, and pixel values representing the overlapping portion of the segment 331 can be adjusted to have a visual effect of eliminating or reducing the dynamic object from the image that is rendered, so as to make the underling portion of the virtualized representation 335 at least partially visible. The image rendering 328 can, for example, implement visual effects of making pixel values for the overlapping portion of the segment 331 translucent, or implementing at least a portion of the segment 331 in outline form, so that the underlying image data for the virtualized representation 335 is visible. Likewise, the image rendering 328 can include processes that blend the virtualized representation 335 with actual image values of the object of interest, in a most recent image frame.

In examples, the visual effects that are applied to the dynamic object may be directed to only a portion of the dynamic object. Further, specific aspects or attributes of the dynamic object may be predetermined to not be reduced or eliminated. For example, if the dynamic object is a tool, the end point of the tool may be predetermined (e.g., by setting) to not receive a visual effect that would reduce or eliminate the depiction of the end point. However, another portion of the tool (e.g., shaft) that occludes the object of interest can be made transparent or outlined to reveal the rendition of the object of interest.

According to examples, the scene building 322 can detect when the state of the object of interest changes in a given image frame. For example, the scene building 322 can track a location of the object of interest in successive image frames. The scene building 322 can further detect changes to a location or appearance (e.g., change in size) of a set of visual features of the object of interest, where such visual features can include, for example, a surface feature, a surface pattern, a characteristic dimensional relationship of the object of interest (e.g., the aspect ratio of the longest and shortest dimension, an orientation of an axis extending through a longest or shortest dimension of the object, etc.) and/or a spatial relationship between the object of interest and a feature or object of reference in the live image. In examples, the scene building 322 can use the change in the orientation and/or location of the object of interest to detect a physical transformation of the object of interest, where the physical transformation includes a translation and/or rotation of the object. In examples, the update 329 can include data that identifies the physical transformation of the object of interest, as detected in the current image frame. In turn, the image rendering 328 can implement the physical transform on the three-dimensional representation 325. The resulting augmented live image 313 can further depict the object of interest after manipulation, with the segment 331 of the dynamic object being visually altered to depict a virtualized rendering of the object of interest, in a state that matches the perceived state of the actual object. By using a stored image for the virtualized representation 335, examples enable the augmented live image 313 to depict a surface or feature of the object of interest that is otherwise hidden in the current image frame.

Figure 4:
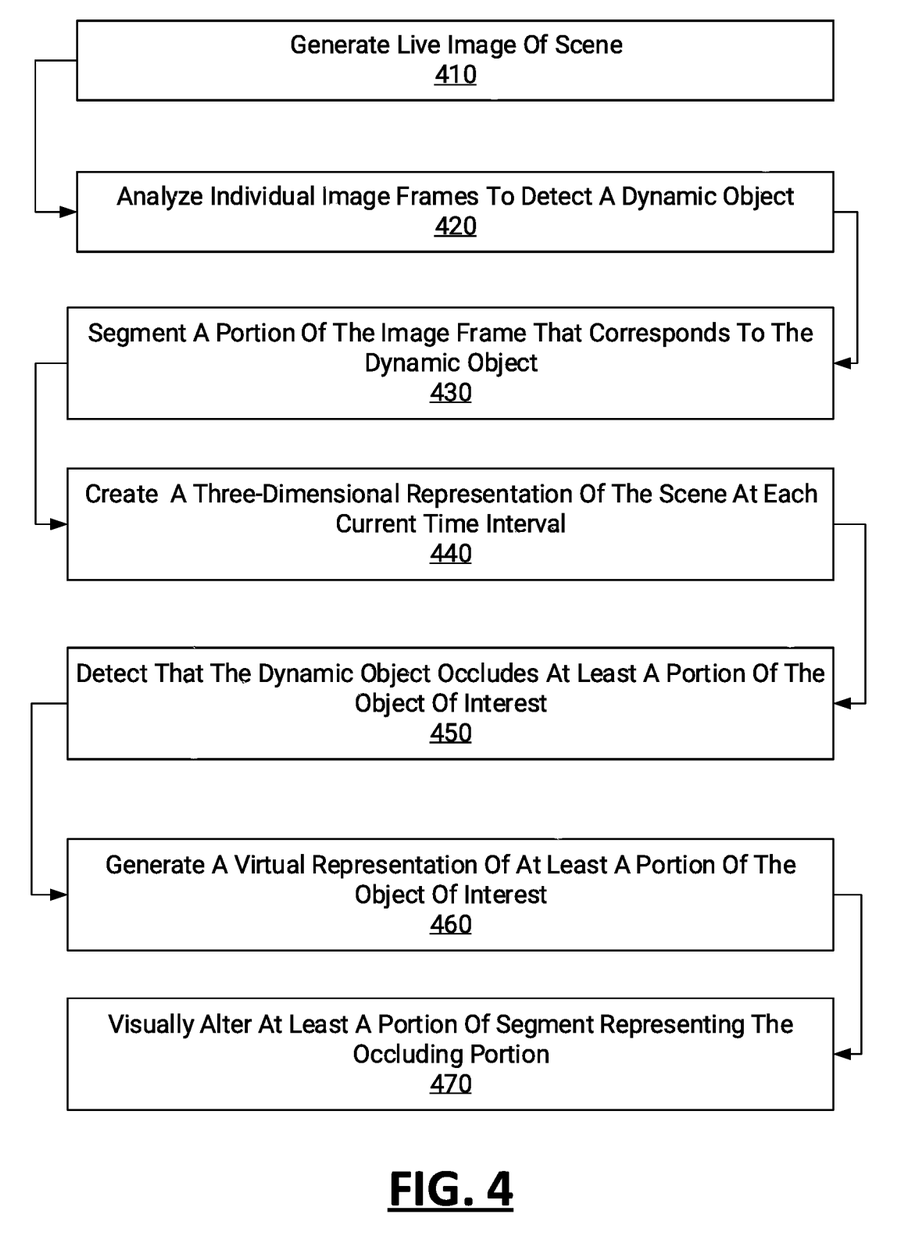
FIG. 4 illustrates an example method for augmenting an occluded object in a live image.

FIG. 4 illustrates an example method for augmenting an occluded object in a live image. In describing an example of FIG. 4, reference is made to elements of FIG. 3 for purpose of illustrating suitable components for performing a step or sub-step being described.

With reference to an example of FIG. 4, the image processing system 300 generates a live image 303 of a scene, using image frames 301 provided by the camera component 310 (410). As described with other examples, the image frames 301 can correspond to a series of image frames that are renderable as a video output on the display device 312.

In examples, the image processing system 300 can analyze individual image frames 301 of the camera component 310 to detect a dynamic object that enters the scene (420). The dynamic object can be detected using, for example, a classifier that detects objects of a particular type (e.g., human hand or tool). The image processing system 300 can, for example, employ one or multiple classifiers 326 to detect objects of a particular type, such as of a hand or tool that is expected to interact and manipulate with the object of interest. Being dynamic, a position, shape, or dimension of the object can change over different image frames, reflecting movement of the object relative to the object of interest.

In examples, the image processing system 300 can segment a portion of the image frame that corresponds to the dynamic object (430). For example, the image processing system 300 can generate the segment 331, representing the depiction of the dynamic object in the scene. The segment 331 may further be associated with position information, to identify the location of the dynamic object in a current image frame. The image processing system 300 can, for example, implement separate processes to track the dynamic object, and to generate the segment 331 to represent the dynamic object in the image frame. The image processing system 300 can also include a process to detect an object and/or orientation of the object of interest, and to provide contextual information that identifies the location and/or state of the object of interest.

In examples, the image processing system can create, from analyzing the image data, a three-dimensional representation of the scene (440), including the position and orientation of the camera component 310 supplying the image data. The image processing system 300 can create the three-dimensional representation 325 of the scene at each current time interval, for use in a subsequent time interval, in the event occlusion of the object of interest occurs in the subsequent time interval. When the dynamic object is detected, the image processing system 300 can use image data from a current image frame to detect and segment the dynamic object, for purpose of excluding the dynamic object (or portions of the dynamic object) from the image data used to create the three-dimensional representation of the scene. In this way, the three-dimensional representation 325 (including the three-dimensional object representation 327) is based on a portion of an image frame that excludes the segment 331 which depicts the dynamic object. The three-dimensional representation 325 can include a three-dimensional object representation 327 for the object of interest, where the three-dimensional object representation 327 includes image data that can be rendered to depict the object of interest in an orientation that is viewable from a particular viewpoint of the camera component 310. The three-dimensional object representation 327 can also identify a location of the object of interest, relative to, for example, persistently static objects or features of the scene.

Additionally, the image processing system 300 can further detect when the dynamic object occludes the object of interest (450). In examples, the image processing system 300 makes the determination based on a location of the segment as compared to the location of the object of interest, which may be determined by, for example, contextual information or other information contained in the update 329.

When occlusion is detected, the image processing system 300 can generate a virtual representation 335 of at least a portion of the object of interest (460). In some examples, the virtual representation 335 can be generated using image data rendered from the three-dimensional representation 325 generated during a previous instance of time.

In some examples, the segment 331, or at least a portion of the segment representing the occluding portion, can be visually altered, using, for example, graphical effects (470). The visual alternation serve to visually reveal the occluded portion of the object of interest (in virtualized form). For example, the occluding portion of the segment 331 can be made hidden, translucent, or outlined, so as to display the occluded portion of the underlying object.

Figure 5A:
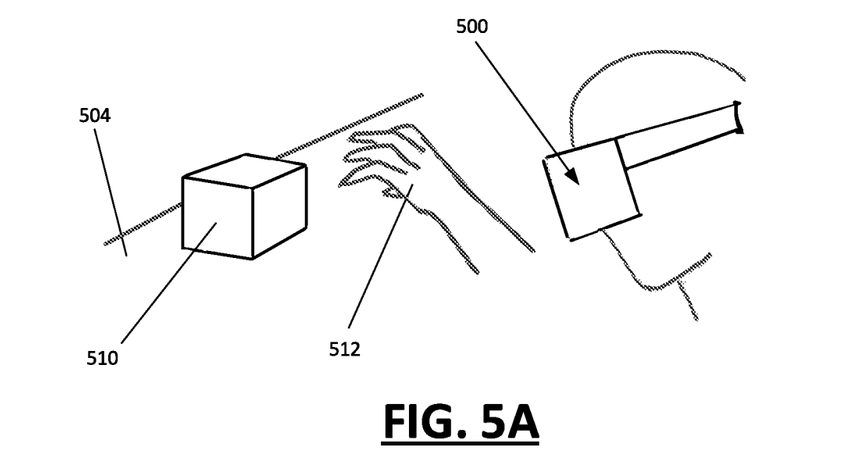
FIG. 5A illustrates use of an example image processing system.

FIG. 5A illustrates use of an example image processing system. As shown by an example of FIG. 5A, an example image processing system can be implemented as a headset computing device ("headset 500") that can be worn by a user 502. The user 502 may wear the headset 500 when manipulating on object of interest 510, which may rest in a scene 504 that is monitored by a camera or set of cameras. The headset 500 may employ an image processing system such as described by various examples. The headset 500 can process image data of the scene to detect when a dynamic object, such as the user hand 512, enters the scene 504.

The headset 500 can include a display device that renders a live image of the scene 504. When the hand 512, for example, enters the scene 504, the headset 500 can implement image processes to detect the hand, and further to detect when the hand occludes the object of interest 510.

Figure 5B:
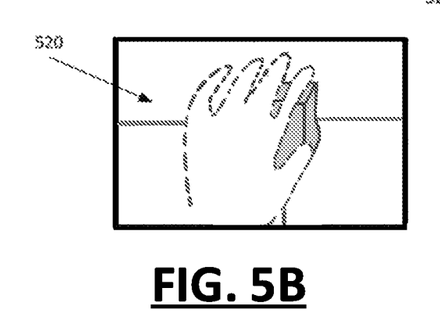
FIG. 5B and FIG. 5C illustrate example effects of image processing on a display of an example headset, as a result of a dynamic object (e.g., a hand) occluding an object of interest.
Figure 5C:
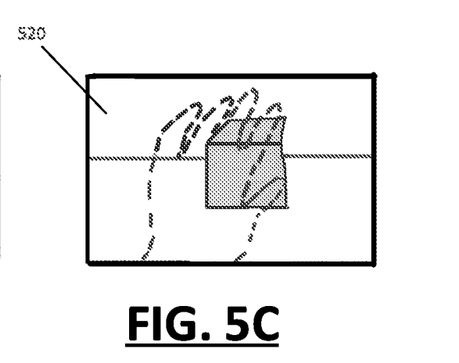

FIG. 5B and FIG. 5C illustrate example effects of image processing on a display of an example headset 500, as a result of a dynamic object (e.g., a hand) occluding an object of interest. Initially, in FIG. 5B, the live image 514 can display the hand 512 in a form that occludes the object of interest 510. In FIG. 5C, the headset 500 implements visual effects from the image processing system 300 to segment the hand 512, so that the hand 512 can be processed as a separate image layer. Further, the headset 500 can implement the image processing system 300 to alter the appearance of the hand 512, by making the hand appear translucent, hidden, or in outline form. In altered form, the underlying object of interest 510 can be revealed. As described by various examples, the headset 500 may generate at least the portion of the object of interest using a stored representation of the object of interest from a most recent prior time interval.

Figure 5D:
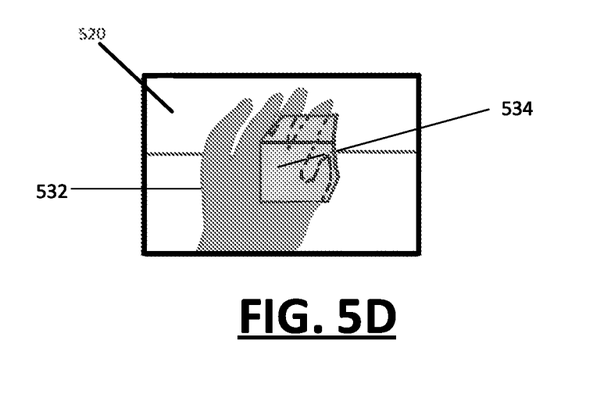
FIG. 5D illustrates an alternative example effect of image processing on the display of an example headset, as a result of a dynamic object (e.g., a hand) occluding an object of interest.

FIG. 5D illustrates an alternative example effect of image processing on the display of an example headset 500, as a result of a dynamic object (e.g., a hand) occluding an object of interest. In an example of FIG. 5D, only a portion 532 of the dynamic object is subjected to the visual effect of becoming translucent or outlined. A non-occluding portion 534 of the dynamic object may be rendered in original or solid form. Still further, in other variations, some portion of the dynamic object that does occlude the object of interest can avoid receiving a visual effect that would reduce or eliminate the depiction of that portion of the dynamic object. For example, the user's fingertips can, for example, be detected separately (e.g., using a separate classifier), and the image processing system 300 can omit applying visual effects to the detected fingertips of the hand. In such examples, the image processing system 300 can, however, apply the visual effects to other portions of the hand (e.g., fingers extending from the tips).

While some examples such as shown by FIG. 5A illustrate the object of interest as a component (e.g., cubic device), in variations, the object of interest can include print media, such as a document, or object on which print or graphics is provided to communicate information (e.g., assembly instructions). In such examples, the augmented image can display the print portion of the document, irrespective of the position of the user's hand.

CONCLUSION

Although specific examples have been illustrated and described herein, it will be appreciated by those of ordinary skill in the art that a variety of alternate and/or equivalent implementations may be substituted for the specific examples shown and described without departing from the scope of the disclosure. This application is intended to cover any adaptations or variations of the specific examples discussed herein.

What is claimed is:

1. A method for augmenting a live image of a scene, the method being implemented by a processor and comprising:
   detecting an occlusion of an object in the live image of the scene;
   accessing a data store that stores a three-dimensional representation of the scene with the object being present; and
   augmenting the live image to depict the object without at least a portion of the occlusion, using the three-dimensional representation of the scene.

2. The method of claim 1, further comprising:
   repeatedly imaging the scene using a camera; and
   analyzing image data generated from the camera to detect the occlusion.

3. The method of claim 2, wherein detecting the occlusion includes detecting a dynamic object.

4. The method of claim 3, wherein detecting the dynamic object includes detecting an object of a particular type in multiple successive image frames as the detected object moves within the scene.

5. The method of claim 4, wherein detecting the object of the particular type includes using a classifier for the object of the particular type.

6. The method of claim 1, wherein augmenting the live image includes retrieving a three-dimensional object representation of the object from the three-dimensional representation of the scene.

7. The method of claim 6, wherein the three-dimensional object representation includes a stored image of the object.

8. The method of claim 6, wherein augmenting the live image includes segmenting a portion of the live image that coincides with the occlusion using a classifier of a predetermined type of object.

9. The method of claim 8, wherein augmenting the live image includes using a visual effect to reduce or eliminate a visibility of the dynamic object while making a virtualized representation of the object visible in at least a region of the live image that coincides with the occlusion, wherein the virtualized representation is based at least in part on the three-dimensional object representation.

10. The method of claim 9, wherein using the visual effect to reduce or eliminate the visibility of the dynamic object includes increasing a transparency of at least a portion of the dynamic object.

11. An image processing system comprising:
a processor;
a memory to store (i) a three-dimensional representation of a scene with a first object being present, and (ii) a set of instructions;
wherein the processor executes the set of instructions to:
generate a live image of the scene using input from the camera;
detect an occlusion of the object in the scene;
access, from the memory, the three-dimensional representation of the scene with the object being present; and
augment the live image to depict the portion of the object that is occluded, using image data provided by the three-dimensional representation.

12. The image processing system of claim 11, further comprising a camera component to generate image frames as input for the processor.

13. The image processing system of claim 11, where the image processing system is implemented by a headset computing device.

14. The image processing system of claim 11, wherein the processor augments the live image by:
retrieving a three-dimensional object representation of the object from the memory;
segmenting a portion of the live image that coincides with the occlusion; and
using a visual effect to reduce or eliminate a visibility of the dynamic object while making a virtualized representation of the object visible in at least a region of the live image that coincides with the occlusion, wherein the virtualized representation is based at least in part on the three-dimensional object representation.

15. A method for augmenting live images of scenes, the method being implemented by one or more processors and comprising:
generating a live image of a scene using a series of image frames provided by a camera component;
analyzing individual image frames of the series;
detecting, from analyzing the individual image frames, a dynamic object that enters the scene;
segmenting a portion of individual image frames which depict the dynamic object;
creating, from analyzing individual image frames of the series, a three-dimensional representation of the scene, using image data of individual image frames that excludes the dynamic object, the three-dimensional representation including a three-dimensional object representation for an object of interest that is present in the scene;
for at least a first image frame of the series, detecting when the dynamic object occludes at least a portion of the object of interest;
generating, using the three-dimensional representation of the scene, a visual representation of the object of interest in the region of the segment corresponding to the dynamic object; and
visually altering at least a portion of the segment that occludes at least the portion of the object of the scene.

* * * * *